US 6,634,988 B2

(12) United States Patent
Shultz et al.

(10) Patent No.: US 6,634,988 B2
(45) Date of Patent: Oct. 21, 2003

(54) TRANSMISSION SHIFT CONTROL

(75) Inventors: Jeffrey E Shultz, Zionsville, IN (US); Scott Thomas Kluemper, Monrovia, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/766,962

(22) Filed: Jan. 23, 2001

(65) Prior Publication Data

US 2002/0098943 A1 Jul. 25, 2002

(51) Int. Cl.$^7$ ............................................... F16H 61/04
(52) U.S. Cl. ........................................ 477/116; 477/114
(58) Field of Search .............................. 477/116, 117, 477/97, 114; 475/116, 121

(56) References Cited

U.S. PATENT DOCUMENTS

| | | | |
|---|---|---|---|
| 4,070,927 A | | 1/1978 | Polak ........................... 74/765 |
| 4,653,622 A | * | 3/1987 | Miyake ......................... 477/73 |
| 5,749,805 A | * | 5/1998 | Shimada et al. ............. 477/116 |
| 5,788,596 A | * | 8/1998 | Robinson et al. ............ 477/114 |
| 5,788,603 A | * | 8/1998 | Tsutsui et al. ............... 477/116 |
| 5,800,308 A | * | 9/1998 | Tsutsui et al. ............... 477/116 |
| 5,906,559 A | * | 5/1999 | Murasugi et al. ............ 477/114 |
| 5,957,808 A | * | 9/1999 | Iizuka ......................... 477/116 |
| 6,152,275 A | * | 11/2000 | Fischer et al. ............... 477/174 |
| 6,317,671 B1 | * | 11/2001 | Tsutsui et al. ............... 477/114 |
| 6,319,170 B1 | * | 11/2001 | Hubbard et al. ............ 477/116 |

* cited by examiner

Primary Examiner—Charles A Marmor
Assistant Examiner—Ha Ho
(74) Attorney, Agent, or Firm—Leslie C. Hodges

(57) ABSTRACT

A transmission control method comprises the steps of determining whether a shift requiring an output shaft lock-up is commanded, wherein such a shift involves a first torque transmitting mechanism either being applied or released while a second torque transmitting mechanism is held engaged. The control determines whether the vehicle is stopped by one or all of the following: verifying the vehicle service brakes are applied, the transmission output speed is near zero, the engine speed is low, the oil sump temperature is greater than a calibration temperature, and the turbine speed is near zero if the vehicle is in forward drive. If the vehicle is stopped, a lock-up torque transmitting mechanism is applied prior to the shift operable to prevent torque transmission to the output shaft. When the lock-up mechanism reaches capacity, the shift proceeds by one of applying and releasing the first mechanism, while maintaining the second mechanism engaged. Once the first mechanism has one of reached capacity and released pressure below a threshold, the lock-up mechanism is released to complete the shift.

6 Claims, 2 Drawing Sheets

Torque Transmitting Mechanism Engaged

|        | C1 | C2 | C3 | C4 | C5 |
|--------|----|----|----|----|----|
| Neutral |    |    |    |    | X  |
| 1st    | X  |    |    |    | X  |
| 2nd    | X  |    |    | X  |    |
| 3rd    | X  |    | X  |    |    |
| 4th    | X  | X  |    |    |    |
| 5th    |    | X  | X  |    |    |
| 6th    |    | X  |    | X  |    |
| Reverse |    |    | X  |    | X  |

TRANSMISSION SHIFT CONTROL

TECHNICAL FIELD

The present invention relates to a shift control algorithm for an automatic transmission.

BACKGROUND OF THE INVENTION

Automatic transmissions commonly employ a "clutch-to-clutch" shift control strategy wherein the interchange between successive forward ratios is accomplished by the disengagement of one of the torque transmitting mechanisms and the substantially simultaneous engagement of another torque transmitting mechanism. To accomplish this strategy, pressure control devices such as pulse width modulated (PWM) solenoids are driven by a transmission controller to directly control oil pressure at the transmission torque transmitting mechanisms.

The PWM signal may be modulated at a constant frequency (e.g. 102 Hz) with varying duty cycles to change oil pressure at the torque transmitting mechanism. These pressure pulses generated by the inherent operation of the PWM solenoid may, in certain circumstances, result in torque spikes being transmitted from the transmission to the vehicle driveline. Such torque spikes may result in a poor shift feel or a shift noise or growl due to the excitement of the driveline. The noise may be accentuated where the transmission is installed in a light, stiff vehicle system. Further the noise may be especially noticeable when the transmission output shaft is stopped. The integration of a spring pack in the torque transmitting mechanism or the addition of an accumulator to the torque transmitting mechanisms feed circuit may reduce the effects of torque spikes but at the expense of increasing system content.

A means is needed to minimize the transfer of torque spikes originating in the transmission to the driveline where it may lead to dissatisfying customer shift noise or feel.

SUMMARY OF THE INVENTION

The present invention relates to a shift control algorithm for an automatic transmission. In particular, the algorithm operates to minimize torque spikes transmitted through the transmission by locking the output drive shaft through the application of torque transmitting mechanisms prior to a shift transition.

When such a shift is commanded, the algorithm verifies the vehicle is effectively stopped prior to applying an output shaft lock-up torque transmitting mechanism. Once the lock-up torque transmitting mechanism reaches capacity, the shift may proceed by either applying a torque transmitting mechanism to capacity or releasing it to below a threshold pressure. The lock-up torque transmitting mechanism is then released, completing the shift.

This shift control algorithm minimizes poor shift feel and noise. It may be easily employed in an existing transmission without the need for additional costly hardware and lead time.

DESCRIPTION OF THE PREFERRED EMBODIMENT

Figures 1, 2:
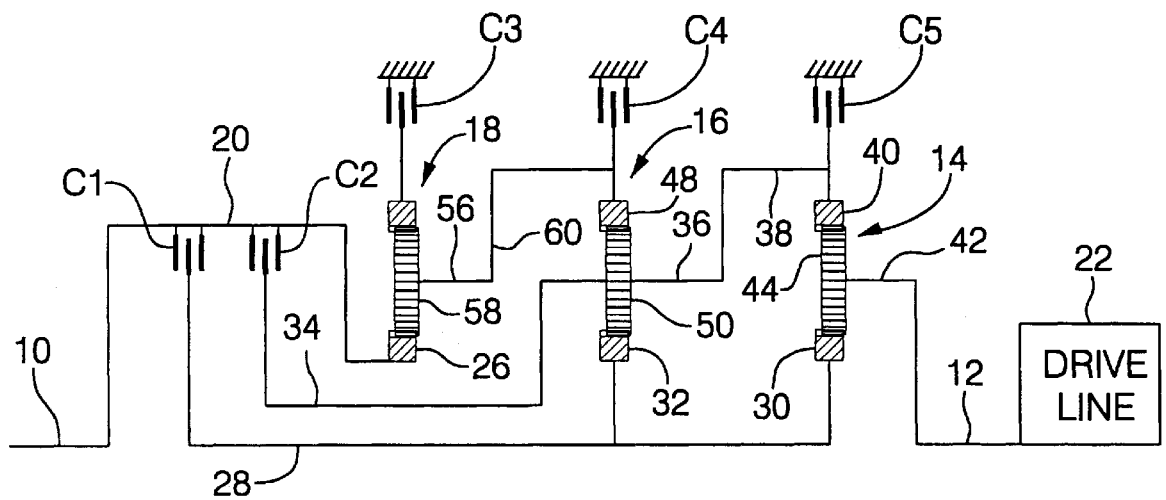
FIG. 1 is a schematic representation of a planetary gearing arrangement.
FIG. 2 is a table of the torque transmitting mechanisms engaged for each gear ratio.

A planetary gearing arrangement is schematically represented in FIG. 1. The arrangement has an input shaft 10, an output shaft 12 and three planetary gear sets 14, 16, and 18 disposed therebetween. Five torque transmitting mechanisms are included where two are represented as rotating clutches, first clutch C1, second clutch C2, and three as stationary clutches or brakes, third clutch C3, fourth clutch C4, and fifth clutch C5. The input shaft 10 is drivingly connected to a drum 20 which drum 20 provides input drives for clutches C1 and C2. The drum 20 is also drivingly connected to a sun gear 26 of the gear set 18. The input shaft 10 is preferably driven by a conventional torque converter, not shown, which is driven by an engine in a well known manner. The output shaft 12 drives a driveline system 22 for transferring torque to the vehicle wheels.

The first clutch C1 is connected to a shaft 28 which in turn is connected to sun gears 30 and 32 of the gear sets 14 and 16 respectively. The second clutch C2 is connected to a shaft 34 which is connected to a planet carrier 36 of gear set 16. The planet carrier 36 is connected through a hub 38 to a ring gear 40 of gear set 14.

The planetary gear set 14 also includes a planet carrier 42 on which is rotatably mounted a plurality of pinion gears 44, only one of which is shown, meshing with the sun gear 30 and ring gear 40. The ring gear 40 is operatively connected to the fifth clutch C5, which may be selectively engaged to restrain rotation of the ring gear 40 and carrier 36. The planet carrier 42 is drivingly connected to the output shaft 12, and thus the driveline 22.

The planetary gear set 16 further includes a ring gear 48 and a plurality of pinion gears 50 rotatably mounted on carrier 36 and meshing with sun gear 32 and ring gear 48. The ring gear 48 is operatively connected to the fourth clutch C4 which may be selectively engaged to restrain rotation of the ring gear 48.

The planetary gear set 18 includes a ring gear 54, a planet carrier 56 and a plurality of pinion gears 58, which are rotatably mounted on carrier 56 and mesh with sun gear 26 and ring gear 54. The carrier 56 is drivingly connected to a hub 60, which is connected to ring gear 48. The ring gear 54 is operatively connected to the third clutch C3, which may be selectively engaged to restrain rotation of ring gear 54.

The stationary and rotational clutches C1–C5 are preferably of the multiple disc type fluid-actuated torque transmitting mechanisms, which are commonly used in planetary gear transmissions. Alternatively, the stationary clutches may be band-type brakes. The construction, operation, and control of these devices are well known to those familiar with the art of power transmissions such that a detailed description of these units is not considered necessary.

The gearing arrangement may be controlled by the torque transmitting mechanisms to provide six forward drive ratios and one reverse drive ratio. The table of FIG. 2 illustrates the combination of engaged torque transmitting mechanisms to establish the drive ratios. First gear is established by the engagement of the first clutch C1 and fifth clutch C5. Second gear is established by the disengagement of the fifth clutch C5 and the substantially simultaneous engagement of the fourth clutch C4. To establish third gear, the fourth clutch C4 is disengaged as the third clutch C3 is engaged. Fourth gear is established by disengaging the third clutch C3 while engaging the second clutch C2. To establish fifth gear, the first clutch C1 is disengaged as the third clutch C3 is substantially simultaneous engaged. The sixth gear is established by disengagement of the third clutch C3 and simultaneous engagement of the fourth clutch C4. Reverse drive ratio is established by engagement of the third clutch C3 and the fifth clutch C5. The transmission is in neutral when only the fifth clutch C5 is engaged.

It is apparent from the foregoing description of the drive ratios that each ratio requires the engagement of different combinations of two of the five torque transmitting mechanisms. Further, the interchange between successive forward ratios is accomplished by the disengagement of one of the clutches (the off-going clutch) and the substantially simultaneous engagement of a second clutch (the on-coming clutch) while maintaining another clutch engaged during the transition.

A transmission electro-hydraulic control system, not shown, operates to control the engagement and disengagement of the clutches through the use of pulse width modulated solenoids and shift valves as is well known in the art. The pulse width modulated signal may be modulated at a constant frequency (e.g. 102 Hz) with varying duty cycles to change oil pressure at a clutch. Under certain conditions (e.g. warm hydraulic fluid, stiff driveline), oil pressure modulated at a constant frequency may lead to corresponding torque spikes transmitted through the transmission output shaft to the drive system.

To minimize or even eliminate the transmittal of torque spikes to the drive system 22 during a Neutral to Drive (N–D), or Drive to Neutral (D–N) shift, the output shaft 12 may be "locked" from rotation due to the application of a lock-up torque transmitting mechanism. In the planetary arrangement described, the fourth clutch C4, the output shaft lock-up mechanism, is applied, in addition to maintaining engagement of the fifth clutch C5 during these transitions. The fifth clutch C5 holds the ring gear 40 of gear set 14, as well as the pinion gears 50 of gear set 16. Engagement of the fourth clutch C4 holds the ring gear 48 of gear set 16, which in conjunction with the held pinion gears 50, restrict the sun gear 32 from rotation. Since the sun gear 32 is restricted, the sun gear 30 of gear set 14 is also kept from rotation. The end result is the planet carrier 42 of gear set 14 is locked from rotation as is the transmission output shaft 12.

Figure 3:
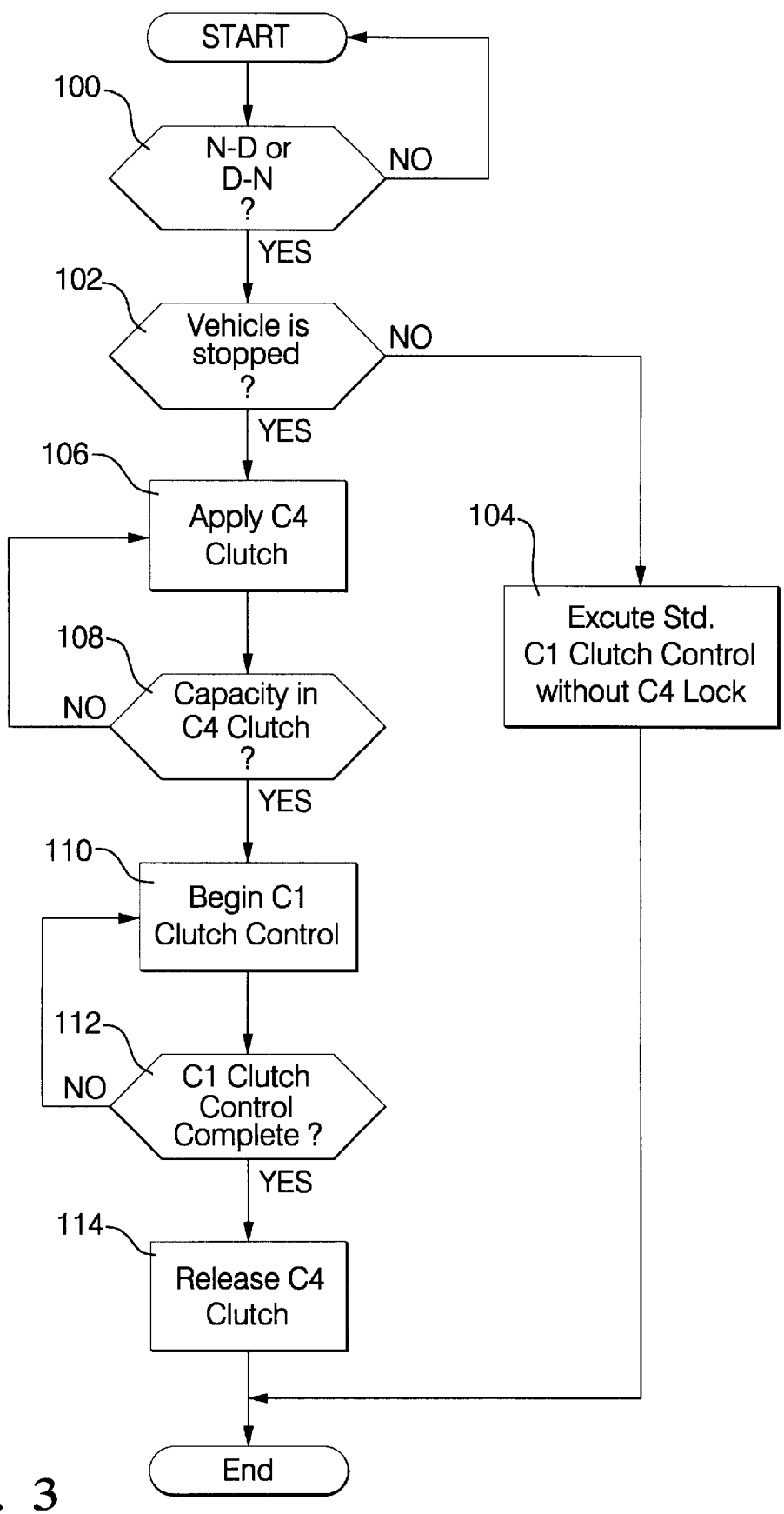
FIG. 3 is a flow chart of the shift control algorithm of the present invention.

The present invention provides a shift control algorithm to accomplish the task of locking the output shaft 12 under discrete conditions as illustrated by the flow chart in FIG. 3. In block 100, the algorithm determines whether the transmission is being commanded to shift from Neutral to Drive or Drive to Neutral. If such a transition is commanded, the flow progresses to block 102 where it is determined whether the vehicle is effectively not moving. This is important so that the output shaft 12 is not abruptly stopped from rotating while the vehicle is in motion. In order to meet the "vehicle is stopped" requirement, some or all of the following criteria must be satisfied for a given time period: a) service brakes applied, b) service brake status operational, c) throttle near zero and valid, d) engine speed is low such as near idle speed and valid, e) transmission output speed near zero, f) turbine speed is near zero if in forward gear, and g) oil sump temperature is greater than the calibration temperature and valid. All of these conditions may be monitored by sensors currently present in the vehicle.

If the vehicle is not stopped, then the standard first clutch control is executed in block 104 without the output shaft lock-up feature i.e. without engaging the lock-up fourth clutch C4 during the shift. In the standard first clutch control transition from Neutral to Drive, the first clutch C1 is the on-coming clutch and the fifth clutch C5 is maintained engaged; there is no off-going clutch. In Drive to Neutral shift, the first clutch C1 is the off-going clutch, while the fifth clutch C5 is maintained engaged; there is no on-coming clutch. In both instances the first clutch transfers torque to the output shaft 12.

If the vehicle is stopped, then the output shaft is locked by channeling apply pressure to the lock-up fourth clutch C4 during the transition from N–D or D–N in block 106. The fourth clutch fill time and initial trim pressure are based on adapted values from other shifts which involve this clutch. In this instance for a N–D shift, the time and pressure are based on the downshift from third to second gear where the fourth clutch C4 is the on-coming clutch. The fill time and initial pressure are adapted to ensure clutch C4 gains capacity with consistent timing. During the apply of the fourth clutch C4, the pressure is ramped on for a calibration time period. At the end of the calibration time period, pressure is increased to a holding pressure and the clutch is referred to as having capacity. In block 108, the control checks to see if the fourth clutch C4 has reached capacity. If not, the apply state of block 106 is continued.

When the fourth clutch C4 reaches capacity, control of the first clutch C1 begins in block 110 while maintaining the clutch C4 engaged. In the transition from Neutral to Drive, the first clutch C1 is the on-coming clutch and the fifth clutch C5 is maintained engaged; there is no off-going clutch. In a D–N shift, the first clutch C1 is the off-going clutch, while the fifth clutch C5 is maintained engaged. In block 112, it is determined whether the first clutch control is complete. For example, in a N–D shift, the control is complete when the first clutch C1 has reached capacity, whereas in a D–N shift, the control is complete when the clutch apply pressure has dropped below a threshold pressure.

Once the first clutch control in block 112 is complete, either the first clutch C1 has reached capacity or the pressure has dropped below threshold, release of the fourth clutch C4 begins in block 114. The off-going pressure and time to release the fourth clutch C4 are adapted from those experienced during downshifts from second to first gear where the fourth clutch is the off-going clutch. The fourth clutch pressure is step reduced to the initial off-going pressure of a second to first shift, then the pressure is ramped down at a calibration ramp rate. The pressures and times are adapted to ensure the fourth clutch C4 consistently loses capacity within a calibration time period. When the control algorithm is completed, only the fifth clutch C5 is engaged in neutral and the fifth clutch C5 and first clutch C1 are engaged for first gear.

The present invention provides a control method of locking the transmission output shaft from rotation during the transition between Neutral and Drive. This decouples the drive system from the transmission and eliminates torque spike transmittal therebetween. When such a shift is commanded, the algorithm verifies the vehicle is effectively stopped before applying the lock-up torque transmitting mechanism. Once the lock-up torque transmitting mechanism reaches capacity, the interchange may proceed by either applying an on-coming torque transmitting mechanism or releasing it and disengaging the lock-up mechanism to complete the shift. With the implementation of the control algorithm, customer dissatisfaction due to noise and shift feel during the neutral to drive transition may be substantially reduced.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A transmission control method comprising the steps of:
   determining whether a shift requiring an output shaft lock-up is commanded, wherein said shift involves a first torque transmitting mechanism either being applied or released while a second torque transmitting mechanism is held engaged;
   determining whether the vehicle is stopped;
   if the vehicle is stopped, applying a lock-up torque transmitting mechanism prior to the shift operable to prevent torque transmission to the output shaft;
   when the lock-up mechanism reaches capacity, proceeding with the shift by one of applying and releasing the first torque transmitting mechanism, while maintaining the second torque transmitting mechanism engaged; then
   releasing the lock-up mechanism.

2. A transmission control method as defined in claim 1 wherein the step of determining whether the vehicle is stopped further includes the steps of:
   verifying a vehicle service brakes are applied;
   verifying a transmission output speed is about zero; and
   verifying an engine speed is about idle.

3. A transmission control method as defined in claim 2 wherein the step of determining whether the vehicle is stopped further includes the steps of:
   verifying the oil sump temperature is greater than a calibration temperature; and
   verifying the turbine speed is about zero if the vehicle is in forward drive.

4. A transmission control method as defined in claim 1 further comprising the step of:
   proceeding with the shift by one of applying and releasing the first torque transmitting mechanism while maintaining the second torque transmitting mechanism engaged, if the vehicle is not stopped.

5. A transmission control method as defined in claim 1 wherein the step of applying the lock-up torque transmitting mechanism further comprising the step of:
   adapting the lock-up torque transmitting mechanism fill time and initial pressure from other transmission shifts involving the lock-up torque transmitting mechanism to ensure capacity is gained or released within a calibration time period.

6. A transmission control method as defined in claim 1 further comprising the step of:
   verifying the first torque transmitting mechanism has one of reached capacity and released pressure below a threshold, prior to releasing the lock-up torque transmitting mechanism.

* * * * *